(«12») United States Patent
Ishikawa et al.

(10) Patent No.: US 11,448,292 B2
(45) Date of Patent: Sep. 20, 2022

(54) TENSIONER (71) Applicant: TSUBAKIMOTO CHAIN CO., Osaka (JP)

(72) Inventors: Yuichiro Ishikawa, Osaka (JP); Osamu Yoshida, Osaka (JP); Yuji Kurematsu, Osaka (JP); Masanori Watanabe, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 237 days.

(21) Appl. No.: 16/877,769

(22) Filed: May 19, 2020

(65) Prior Publication Data

US 2020/0393023 A1 Dec. 17, 2020

(30) Foreign Application Priority Data

Jun. 11, 2019 (JP) .............................. JP2019-108589

(51) Int. Cl.
*F16H 7/08* (2006.01)

(52) U.S. Cl.
CPC ........ *F16H 7/08* (2013.01); *F16H 2007/0802* (2013.01); *F16H 2007/0806* (2013.01); *F16H 2007/0812* (2013.01); *F16H 2007/0814* (2013.01); *F16H 2007/0859* (2013.01)

(58) Field of Classification Search
CPC ............... F16H 7/08; F16H 2007/0802; F16H 2007/0806; F16H 2007/0812; F16H 2007/0814; F16H 2007/0817; F16H 2007/0859; F16H 2007/0891; F16H 2007/0895; F16H 2007/0897; F16H 7/0834; F16H 7/0836; F15B 13/024
See application file for complete search history.

(56) References Cited

U.S. PATENT DOCUMENTS

| 4,507,103 | A  | * | 3/1985  | Mittermeier | .......... | F16H 7/0836 |
|           |    |   |         |             |            | 474/111     |
| 5,879,256 | A  | * | 3/1999  | Tada        | ..........  | F16H 7/0848 |
|           |    |   |         |             |            | 474/111     |
| 6,193,623 | B1 | * | 2/2001  | Koch        | ..........  | F16H 7/0836 |
|           |    |   |         |             |            | 474/138     |
| 6,322,468 | B1 | * | 11/2001 | Wing        | ..........  | F16H 7/0848 |
|           |    |   |         |             |            | 474/135     |

(Continued)

FOREIGN PATENT DOCUMENTS

JP 2018-165571 A 10/2018

*Primary Examiner* — Michael R Mansen
*Assistant Examiner* — Raveen J Dias
(74) *Attorney, Agent, or Firm* — WHDA, LLP (57) ABSTRACT To provide a tensioner that can keep the oil pressure in an oil pressure chamber stable and consistently generate suitable reaction force and damping force to impact loads to reduce looseness in the chain and noise. A piston is set such as to partition an inner space of a plunger into an adjustment space on the front side and the oil pressure chamber on the rear side, a piston restricting member restricting the movement of the piston toward the adjustment space. An oil relief mechanism is configured to cause the piston to move forward when oil pressure in the oil pressure chamber rises so as to discharge oil inside the oil pressure chamber to the outside. The piston restricting member has an orifice function that can control the amount of discharged oil.

5 Claims, 9 Drawing Sheets

(56) References Cited

U.S. PATENT DOCUMENTS

| | | | | |
|---|---|---|---|---|
| 6,352,487 B1* | 3/2002 | Tada | F01L 1/02 | 474/110 |
| 6,361,458 B1* | 3/2002 | Smith | F16H 7/0848 | 474/110 |
| 6,383,103 B1* | 5/2002 | Fujimoto | F16H 7/08 | 474/110 |
| 6,398,682 B1* | 6/2002 | Suzuki | F16H 7/0848 | 474/110 |
| 6,435,993 B1* | 8/2002 | Tada | F16H 7/0836 | 474/110 |
| 2002/0052259 A1* | 5/2002 | Nakakubo | F16H 7/0848 | 474/110 |
| 2006/0003859 A1* | 1/2006 | Sato | F16H 7/0836 | 474/110 |
| 2006/0089221 A1* | 4/2006 | Hashimoto | F01L 1/02 | 474/101 |
| 2008/0280712 A1* | 11/2008 | Ryouno | F16H 7/0848 | 474/110 |
| 2009/0017949 A1* | 1/2009 | Sato | F16H 7/0836 | 474/111 |
| 2010/0093474 A1* | 4/2010 | Onimaru | F16H 7/0848 | 474/110 |
| 2011/0263366 A1* | 10/2011 | Botez | F16H 7/0848 | 474/110 |
| 2013/0337954 A1* | 12/2013 | Bauer | F16H 7/08 | 474/110 |
| 2014/0179471 A1* | 6/2014 | Markley | F16H 7/0836 | 474/110 |
| 2015/0354674 A1* | 12/2015 | Markley | F16H 7/0848 | 474/110 |
| 2016/0084359 A1* | 3/2016 | Wigsten | F16H 7/0848 | 474/110 |
| 2016/0290447 A1* | 10/2016 | Kunimatsu | F16H 7/0848 | |
| 2016/0305512 A1* | 10/2016 | Takagi | F16H 7/0836 | |
| 2016/0327135 A1* | 11/2016 | Fischer | F16H 7/0836 | |
| 2017/0130807 A1* | 5/2017 | Kurematsu | F16H 7/0848 | |
| 2017/0138443 A1* | 5/2017 | Kurematsu | F16H 7/0838 | |
| 2018/0223967 A1* | 8/2018 | Baddaria | F16H 7/0848 | |
| 2018/0274636 A1* | 9/2018 | Watanabe | F16H 7/14 | |
| 2018/0274638 A1* | 9/2018 | Watanabe | F16H 7/0848 | |
| 2019/0063562 A1* | 2/2019 | Watanabe | F16H 7/0831 | |
| 2019/0107178 A1* | 4/2019 | Yoshida | F16H 7/0848 | |
| 2019/0128389 A1* | 5/2019 | Ullein | F16H 7/0834 | |
| 2019/0195123 A1* | 6/2019 | Iwasaki | F02B 67/06 | |
| 2019/0277370 A1* | 9/2019 | Iwasaki | F16H 7/08 | |
| 2019/0316658 A1* | 10/2019 | Sun | F16H 7/08 | |
| 2019/0323580 A1* | 10/2019 | Watanabe | F16H 7/08 | |
| 2020/0116172 A1* | 4/2020 | Sun | F16K 27/0245 | |

* cited by examiner

TENSIONER

BACKGROUND OF THE INVENTION

1. Field of the Invention

The present invention relates to a tensioner that applies appropriate tension to a running chain, belt, or the like.

2. Description of the Related Art

It has been common practice to use a tensioner for maintaining appropriate tension of a chain or the like. For example, a known chain guide mechanism uses a tensioner to urge a tensioner lever for slidably guiding a drive chain, such as an endless roller chain passing over respective sprockets of a crankshaft and a cam shaft inside an engine room, to maintain appropriate tension of the chain or the like.

Figure 9:
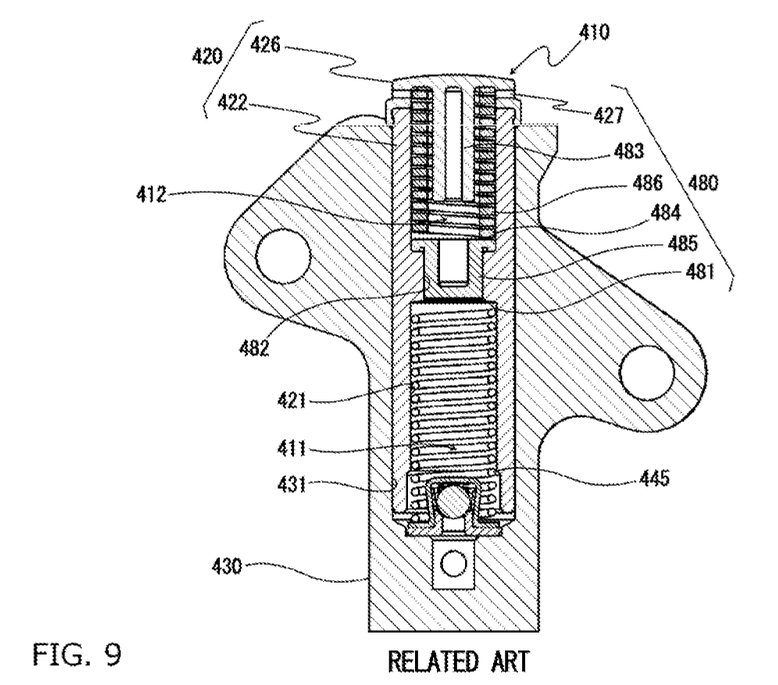
FIG. 9 is a cross-sectional view illustrating one configuration example of an existing tensioner.

As one example of a tensioner used in such a chain guide mechanism, a tensioner 410 is known, which includes, as shown in FIG. 9, a plunger 420 having a plunger hole 421 that is open on a rear side, a housing 430 having a plunger bore 431 that is open on a front side and accommodates the plunger 420, a main biasing means 445 accommodated inside an oil pressure chamber 411 formed between the plunger 420 and the plunger bore 431 such as to freely expand and contract and to bias the plunger 420 forward, and a pressure adjusting mechanism 480 that adjusts the oil pressure in the oil pressure chamber 411 (see, for example, Japanese Patent Application Laid-open No. 2018-165571).

In the tensioner 410 described in Japanese Patent Application Laid-open No. 2018-165571, the pressure adjusting mechanism 480 includes a cylinder part 481 having a cylindrical inner circumferential surface 482, a piston unit 485 set inside the cylinder part 481 and partitioning the space formed between the plunger 420 and the housing 430 into the oil pressure chamber 411 and an adjustment space 412, a piston spring 486 that biases the piston unit 485 toward the oil pressure chamber 411, a first restricting part 483 that restricts the movement of the piston unit 485 toward the adjustment space 412, and a second restricting part 484 that restricts the movement of the piston unit 485 toward the oil pressure chamber 411.

The plunger 420 is made up of a cylindrical plunger body 422 having the plunger hole 421, and a cap member 426 attached to the front end of the plunger body 422 and forming the bottom part at the front end of the plunger hole 421. An external relief hole 427 that allows the adjustment space 412 to communicate with the outside of the plunger 420 is formed in the cap member 426.

When the oil pressure in the oil pressure chamber 411 rises in this tensioner 410, the piston unit 485 moves toward the adjustment space 412, while the oil in the oil pressure chamber 411 flows into the adjustment space 412 via a minute gap between the cylinder part 481 and the piston unit 485, to stabilize the oil pressure in the oil pressure chamber 411. The oil in the adjustment space 412 is discharged in a timely manner from the external relief hole 427 provided in the cap member 426.

SUMMARY OF THE INVENTION

While the tensioner 410 described in Japanese Patent Application Laid-open No. 2018-165571 is able to inhibit application of an excessive chain tension that is caused by the oil pressure in the oil pressure chamber 411 becoming too high, the damping effect by the oil cannot be fully achieved when the plunger 420 is pushed back largely by a large impact load, which may be caused, for example, by looseness in the chain. This is because of the oil being rapidly discharged to the outside as the piston unit 485 moves with the rising oil pressure in the oil pressure chamber 411 even though the adjustment space 412 is filled with the oil, since the external relief hole 427 has a much larger flow path area than the minute gap between the cylinder part 481 and the piston unit 485. Namely, the issue found here is that the plunger 420 reciprocates with the impact loads applied from the chain and is not able to generate a reaction force (i.e., pressing force of the plunger 420) other than the pressing force of the piston spring 486, which results in looseness in the chain, noise generated by the chain being pressed too much, or deterioration of friction properties on the chain and its traveling surface.

An object of the present invention is to solve the problems described above and to provide a tensioner that can keep the oil pressure in the oil pressure chamber stable and consistently generate suitable reaction force and damping force to impact loads to reduce looseness in the chain and noise.

The present invention solves the problems described above by providing a tensioner including: a plunger having a plunger hole that is open on a rear side; a housing having a plunger bore that is open on a front side and accommodates the plunger slidably; a main biasing means accommodated in an oil pressure chamber formed between the plunger and the plunger bore such as to freely extend and contract, and urging the plunger to the front side; and a relief mechanism that relieves oil inside the oil pressure chamber out of the plunger when the oil pressure in the oil pressure chamber rises, the relief mechanism including a partition part that partitions inside of the plunger hole into the oil pressure chamber and an adjustment space and includes an internal relief hole that allows the oil pressure chamber to communicate with the adjustment space, an external relief hole formed to the plunger and allowing the adjustment space to communicate with an outer space, a piston set such as to be slidable back and forth with at least part thereof being positioned inside the internal relief hole, a piston biasing means that biases the piston toward the oil pressure chamber, and a piston restricting member set such as to be biased toward the front side by the piston biasing means and restricting movement of the piston toward the adjustment space, the piston restricting member having an orifice function that allows for control of an amount of oil discharged from the adjustment space via the external relief hole.

According to the invention, the amount of oil discharged from the adjustment space as the piston moves is controlled by the piston restricting member having an orifice function, so that the damping effect by the oil can be achieved reliably. This makes it possible to keep the oil pressure in the oil pressure chamber stable, to stabilize the piston unit behavior in accordance with the moving amount (vibration amplitude) or speed of the plunger, i.e., to optimize the reaction force of the tensioner (pressing force of the plunger). Accordingly, looseness in the chain, or noise caused by the chain being pressed too much, or deterioration of friction properties between the chain and its traveling surface, are prevented.

According to the invention, the amount of oil discharged from the adjustment space as the piston moves is controlled in accordance with the flow resistance of the oil discharge path that forms an orifice, so that the damping effect by the oil can be achieved reliably.

Since the oil discharge path is formed by the piston restricting member abutting on the top face of the plunger hole, structural restrictions on the position where the external relief hole is to be formed and on the oil discharge path are alleviated, which provides a high degree of design freedom.

According to the inventionthe amount of discharged oil is controlled by the orifice, which allows the damping effect by the oil to be achieved reliably when the piston moves away from the oil pressure chamber and the volume of the adjustment space is reduced.

According to the invention, it is possible to design the coil spring that is the piston biasing means to have a large diameter. This ensures a stable attitude of the coil spring. It is also possible, by designing the coil spring to have a large biasing force, to avoid creation of a gap between the top face on the front side of the plunger hole and the front end face of the piston restricting member.

According to the invention, the plunger body can be produced easily, since the plunger body can be processed from both front side and rear side. Also, since the constituent parts such as the piston and the like can be set inside the plunger body from the front side of the plunger body, the assembling of the components can be readily achieved.

According to the invention, the piston restricting member is made of a resin material, which alleviates the impact when the piston restricting member contacts the piston.

DESCRIPTION OF THE PREFERRED EMBODIMENTS

Hereinafter a tensioner according to the present invention will be described with reference to the drawings.

Figure 1:
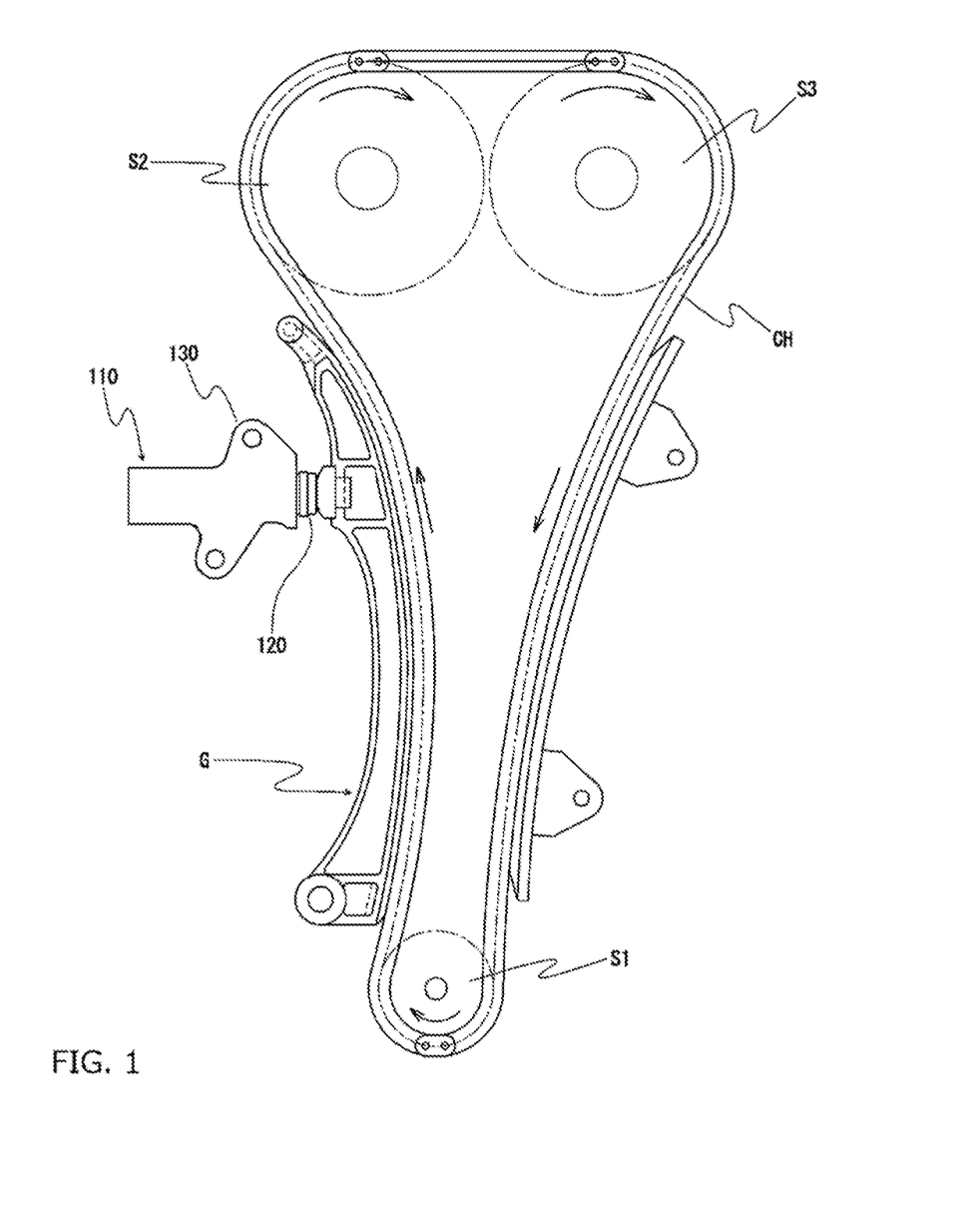
FIG. 1 is an illustrative diagram showing a timing system in which a tensioner of the present invention is incorporated.

As shown in FIG. 1, the tensioner 110 of the present invention is incorporated in a chain drive device used in a timing system or the like of a car engine to apply appropriate tension to the slack side of a drive chain CH passed over a plurality of sprockets S1 to S3 via a tensioner lever G to reduce vibration during the drive, and attached to an engine block (not shown).

Figure 2:
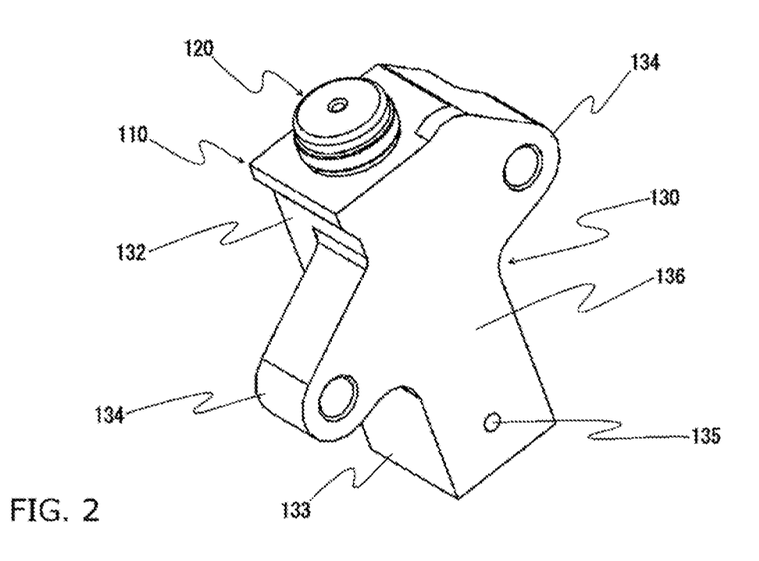
FIG. 2 is a perspective view illustrating one configuration example of the tensioner of the present invention.
Figure 3:
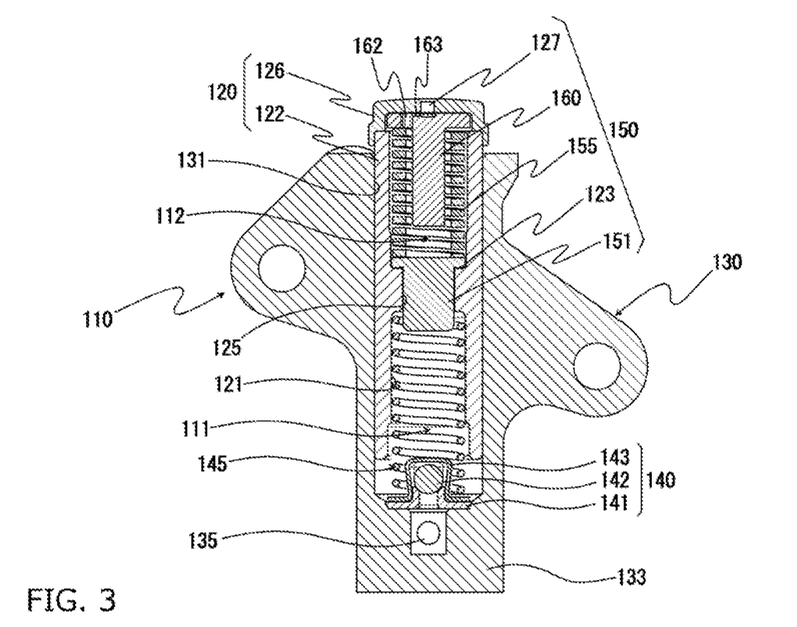
FIG. 3 is a cross-sectional view of the tensioner shown in FIG. 2 when cut along a plane parallel to an attachment surface containing the center axis of the plunger.

FIG. 2 is a perspective view illustrating one configuration example of the tensioner of the present invention. FIG. 3 is a cross-sectional view of the tensioner shown in FIG. 2 when cut along a plane parallel to an attachment surface containing the center axis of the plunger.

This tensioner 110 includes a plunger 120 having a plunger hole 121 open on a rear side, a housing 130 having a plunger bore 131 open on a front side and accommodating the plunger 120 slidably, a main biasing means 145 accommodated in an oil pressure chamber 111 formed between the plunger 120 and the plunger bore 131 such as to freely extend and contract and urging the plunger to the front side, and a relief mechanism 150 that relieves oil inside the oil pressure chamber 111 to the outside of the plunger 120 when the oil pressure in the oil pressure chamber 111 rises.

The plunger 120 of this embodiment is made up of a cylindrical plunger body 122 made of metal such as iron, and a cap member 126 made of synthetic resin or metal and attached to the front end of the plunger body 122.

The plunger body 122 is provided with a partition part 123 that partitions the plunger hole 121 into the oil pressure chamber 111 and an adjustment space 112, and that includes therein an internal relief hole 125 that allows the oil pressure chamber 111 to communicate with the adjustment space 112.

Figure 4:
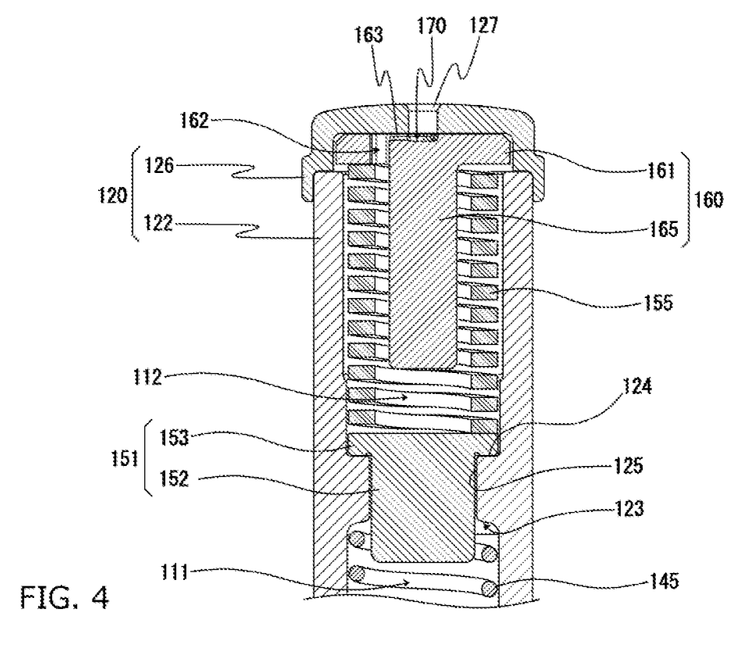
FIG. 4 is an enlarged cross-sectional view of a schematic illustration of part of FIG. 3.

The partition part 123 is formed by an annular protrusion 124 protruding from an inner circumferential wall of the plunger hole 121 radially and annularly inward such as to form the cylindrical internal relief hole 125 along the center axis of the plunger body 122 (see FIG. 4). The annular protrusion 124 is formed in the middle of the axial direction, but the position of the annular protrusion 124 is not limited and can be set as desired in accordance with the purpose.

In the tensioner 110 of this embodiment, the space positioned on the front side of the annular protrusion 124 forms the adjustment space 112, and the space positioned on the rear side of the annular protrusion 124 and the plunger bore 131 together form the oil pressure chamber 111.

The cap member 126 includes an external relief hole 127 opened in an inner face of the cap member 126 that forms the top face on the front side of the plunger hole 121 to allow the adjustment space 112 to communicate with the space outside the tensioner 110. The external relief hole 127 is a through hole extending axially along the center axis of the plunger 120, for example.

While the external relief hole 127 is opened in the inner face of the cap member 126 in this embodiment, the external relief hole 127 may be formed in an inner circumferential surface of the cap member 126, i.e., the position and other specific configurations of the external relief hole 127 are not limited.

The housing 130 includes a columnar main body 132 having the plunger bore 131, and an attachment part 134 integrally formed with the main body 132 to be used for securely attaching the tensioner 110 to an engine block that is the object to which the tensioner is attached. One surface of the main body 132 and one surface of the attachment part 134 form a continuous flat surface which makes an attachment surface 136 to be attached to the engine block.

An oil supply path 135 is formed in a bottom part 133 of the main body 132 for supplying oil into the oil pressure chamber 111 from the outside. One end of the oil supply path 135 opens in the attachment surface 136, while the other end opens in the bottom surface of the plunger bore 131.

A check valve 140, which allows oil to flow in from the outside into the oil pressure chamber 111 through the oil supply path 135 and prevents the oil from flowing out from the oil supply path 135, is set in the plunger bore 131 of the housing 130.

The check valve 140 is made up of a ball seat 141 disposed in tight contact with the bottom surface of the plunger bore 131, a spherical check ball 142 that can be seated on the ball seat 141 in tight contact therewith, and a retainer 143 arranged on the front side of the check ball 142 to restrict the movement of the check ball 142.

Optionally, a ball spring may be disposed between the check ball 142 and the retainer 143 to bias the check ball 142 toward the ball seat 141.

The main biasing means 145 is a coil spring made of a round wire coiled into a helical shape, for example. The main biasing means 145 is set inside the oil pressure chamber 111, with its front end abutted on a rear end face of the annular protrusion 124 and its rear end abutted on a front end face of a flange part of the retainer 143 such that the coil axis extends along the center axis of the plunger 120. Thus, the main biasing means 145 presses the ball seat 141 and the retainer 143 against the bottom wall of the housing 130.

The relief mechanism 150 includes, as shown in FIG. 4, the partition part 123 formed in the plunger body 122, the external relief hole 127 formed in the cap member 126, a piston 151 set such as to be slidable back and forth with at least part of it being positioned inside the internal relief hole 125 of the partition part 123, a piston biasing means 155 that is accommodated in the adjustment space 112 and biases the piston 151 toward the oil pressure chamber 111, and a piston restricting member 160 that restricts the movement of the piston 151 toward the adjustment space 112.

The piston 151 is made of synthetic resin or metal, and includes a columnar piston main body 152, and a flange part 153 on one end of the piston main body 152 facing the adjustment space 112. The piston main body 152 is set inside the internal relief hole 125 such that the other end protrudes out from the rear end face of the annular protrusion 124 that forms the partition part 123. The rear end face of the flange part 153 engages with a front end face of the annular protrusion 124 that forms the partition part 123, and thus the partition part 123 functions also as a restricting part that restricts the movement of the piston 151 toward the oil pressure chamber 111 (rearward).

The piston biasing means 155 is a coil spring made of a rectangular wire coiled into a helical shape, for example, and set on the front end face of the flange part 153 of the piston 151 such that the coil axis extends along the center axis of the plunger 120.

Figure 5:
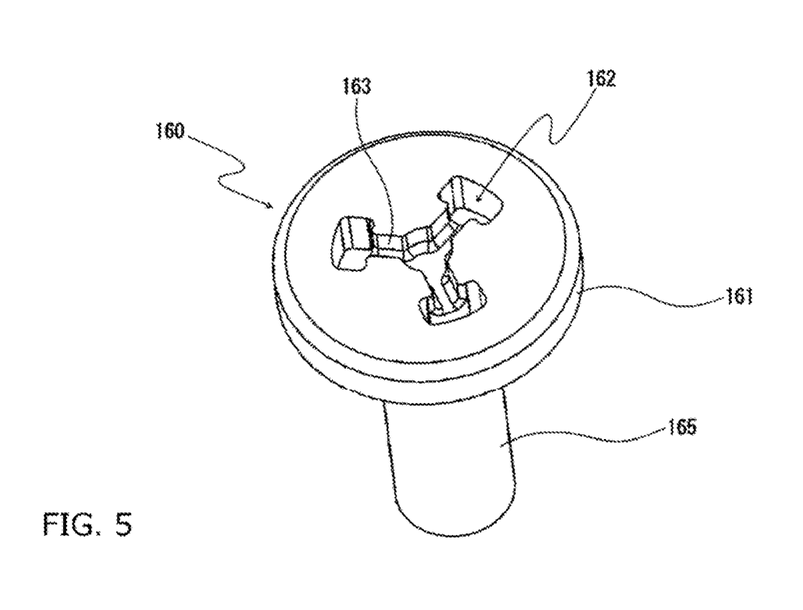
FIG. 5 is a perspective view illustrating the structure of a piston restricting member in the tensioner shown in FIG. 1 as viewed from one side of a base member.

The piston restricting member 160 includes, as shown also in FIG. 5, a disc-like base part 161, and a rod-like shaft part 165 that extends continuously from the other surface (facing the adjustment space 112) of the base part 161 rearward.

The piston restricting member 160 is set such that one surface of the base part 161 is in contact with the inner face of the cap member 126 and that the shaft part 165 extends radially inside the piston biasing means 155, i.e., such that the shaft part is passed through inside the piston biasing means 155 to extend along the coil axis.

The base part 161 of the piston restricting member 160 doubles as a spring receiving part for the piston biasing means 155, and the front end of the piston biasing means 155 is abutted on the other surface of the base part 161. Thus, the piston restricting member 160 is biased toward the front side and pressed against the cap member 126 by the piston biasing means 155.

The base part 161 of the piston restricting member 160 is formed with a communication part 162 that connects the one surface abutted on the inner face of the cap member 126 with the other surface positioned to face the adjustment space 112.

The communication part 162 is made up of a plurality of through holes (three through holes in this embodiment) extending in the thickness direction of the base part 161. The plurality of through holes are circumferentially equally distanced from each other on the same circle, for example.

In the one surface of the base part 161 of the piston restricting member 160 are formed orifice grooves 163, each extending linearly from each of the plurality of through holes radially toward the center of the base part 161.

Thus in the tensioner 110 of this embodiment, an oil discharge path 170 that allows the adjustment space 112 to communicate with the external relief hole 127 is provided between the cap member 126 and the piston restricting member 160 with orifices formed therein by the orifice grooves 163 and the flat inner face of the cap member 126 to which the one surface of the base part 161 is abutted.

The piston restricting member 160 should preferably be made of a resin material having excellent heat resistance. Examples of such resin material include polyamide resins such as nylon 46, nylon 66, glass-reinforced nylon, and the like.

In the tensioner 110 of this embodiment, normally, the rear end face of the flange part 153 of the piston 151 (end face facing the oil pressure chamber 111) is in contact with the front end face of the annular protrusion 124 as shown in FIG. 4 by the biasing force of the piston biasing means 155 so that a seal is provided between the rear end face of the flange part 153 and the front end face of the annular protrusion 124 to stop the oil in the oil pressure chamber 111 from leaking into the adjustment space 112.

Figure 6:
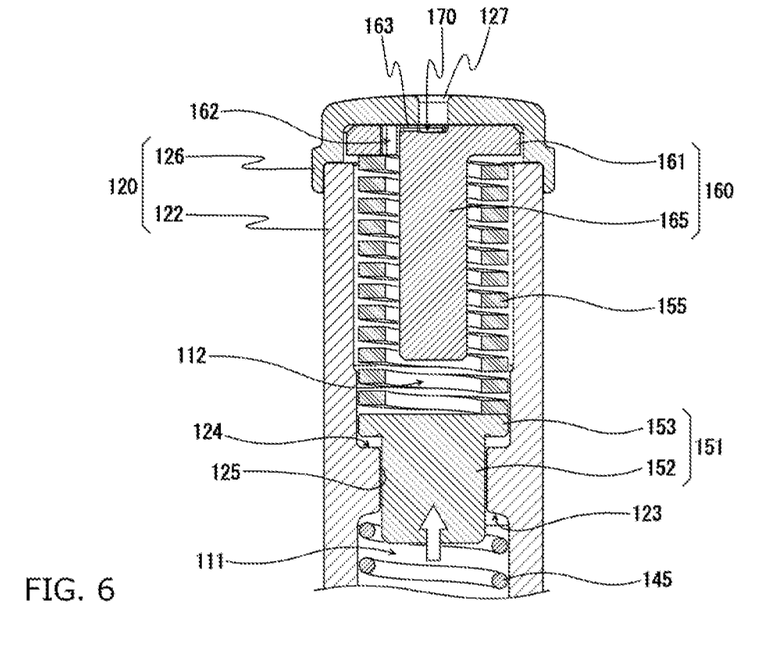
FIG. 6 is a cross-sectional view showing a state of the relief mechanism when the oil pressure in the oil pressure chamber rises.

When the oil pressure in the oil pressure chamber 111 rises, the piston 151 is pushed by the rising oil pressure in the oil pressure chamber 111 and moves forward as shown in FIG. 6. This causes the rear end face of the flange part 153 of the piston 151 to separate from the front end face of the annular protrusion 124 to release the seal between the piston 151 and the annular protrusion 124, so that oil in the oil pressure chamber 111 flows into the adjustment, space 112 through a minute gap between the outer circumferential surface of the piston main body 152 and the circumferential surface of the internal relief hole 125.

The oil inside the adjustment space 112 flows into the oil discharge path 170 via the communication part 162 of the piston restricting member 160 and is discharged via the external relief hole 127. Since the oil discharge path 170 has orifices formed therein, the amount of oil discharged from the adjustment space 112 as the piston 151 moves is controlled in accordance with the flow resistance of the oil discharge path 170. As the volume of the adjustment space 112 decreases in accordance with the amount of movement of the piston 151, the damping effect by the oil is reliably achieved. For example, when the plunger vibration amplitude is small, the oil inside the adjustment space 112 is discharged through the oil discharge path 170 (orifices) in a timely manner so that the piston 151 can move smoothly to keep the reaction force of the tensioner 110 consistent. On the other hand, when the plunger vibration amplitude is large, oil discharge from the adjustment space 112 is not fast enough to catch up with the movement of the piston 151, so that the pressure in the adjustment space 112 rises and the piston 151 slows down. This way, the oil pressure in the oil pressure chamber 111 is stabilized, which makes the behaviors of the piston 151 stable, i.e., optimizes the reaction force (pressing force of the plunger 120) of the tensioner 110. Accordingly, looseness in the chain, or noise caused by the chain being pressed too much, or deterioration of friction properties between the chain and its traveling surface, are prevented.

While one embodiment, of the present invention has been described in detail, the present invention is not limited to the embodiment described above and may be carried out with various design changes without departing from the scope of the present invention set forth in the claims.

For example, while the tensioner 110 was described as a component to be incorporated in a timing system of a car engine in the embodiments above, the purpose of use of the tensioner 110 is not limited to this specific application.

While the tensioner 110 was described as a component that applies tension to a drive chain CH via a tensioner lever G in the embodiment above, the plunger 120 may directly guide the drive chain CH slidably with a distal end thereof to apply tension to the drive chain CH.

The tensioner may not necessarily be applied to a transmission mechanism with a drive chain CH but may also be used for similar transmission mechanisms that use belts, ropes and the like, and can be applied in a variety of industrial fields where it is required to apply tension to an elongated component.

While the housing 130 accommodating the plunger 120 is described as the component known as a tensioner body that is attached to an engine block or the like in the embodiment described above, the housing 130 is not limited to the specific form described above and may be a cylindrical component known as a sleeve inserted into a body hole formed in the tensioner body.

In the present invention, as long as the orifice function is provided, the piston restricting member is not limited to the configuration wherein orifice grooves are formed in one surface in contact with the top face of the plunger. For example, the orifice grooves may be formed in the other surface in contact with the plunger, or, other holes or notches configured to control the amount of discharged oil, i.e., to achieve a flow resistance, may be provided instead of the orifice grooves.

The flow path structure of the oil discharge path having orifices therein is not limited to a particular one.

Figure 7:
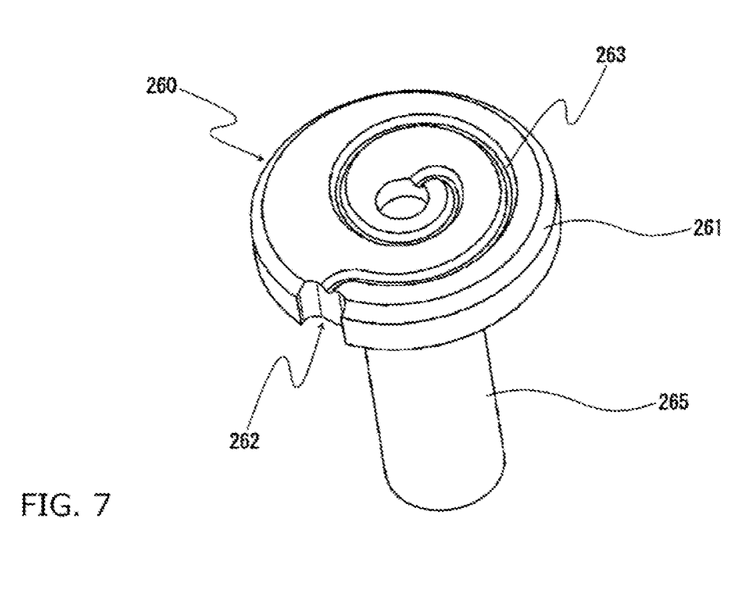
FIG. 7 is a perspective view illustrating another configuration example of the piston restricting member as viewed from one side of the base member.

FIG. 7 is a perspective view illustrating another configuration example of the piston restricting member as viewed from one side of the base member.

This piston restricting member 260 includes a disc-like base part 261 having a communication part 262 that connects one surface in contact with the top face of the plunger and the other surface positioned to face the adjustment space, and an orifice groove 263 formed in the one surface, and a rod-like shaft part 265 extending rearward continuously from the other surface of the base part 261. The communication part 262 is a notch formed in an outer circumferential surface of the base part 261. The orifice groove 263 has a V-shaped cross section and extends helically from the communication part 262 toward the center of the base part 261. The base part 261 doubles as the spring receiving part of the piston biasing means, and the piston restricting member 260 is biased forward and pressed against the cap member by the piston biasing means. Thus, an orifice is formed in the oil discharge path by the orifice groove 263 and the flat inner face of the cap member.

Figure 8:
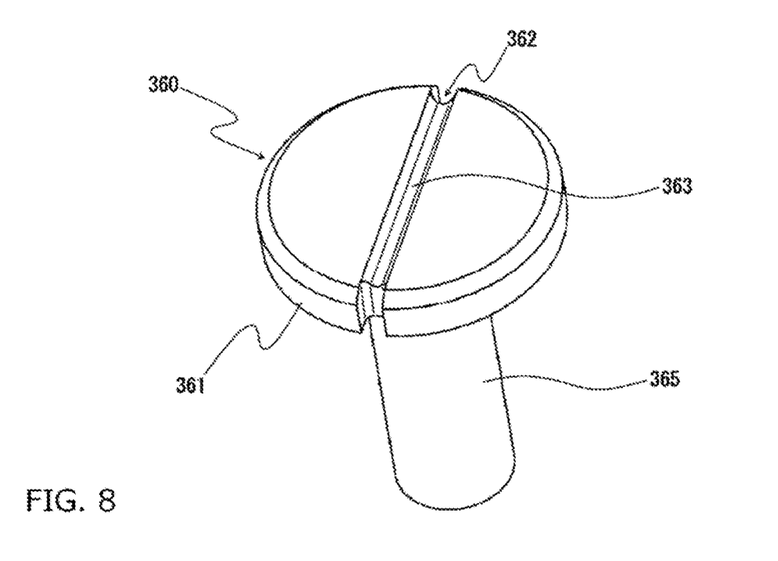
FIG. 8 is a perspective view illustrating yet another configuration example of the piston restricting member as viewed from one side of the base member.

FIG. 8 is a perspective view illustrating yet another configuration example of the piston restricting member as viewed from one side of the base member.

This piston restricting member 360 includes a disc-like base part 361 having a communication part 362 that connects one surface in contact with the top face of the plunger and the other surface positioned to face the adjustment space, and an orifice groove 363 formed in the one surface, and a rod-like shaft part 365 extending rearward continuously from the other surface of the base part 361. The communication part 362 is made up of two notches formed in the outer circumferential surface of the base part 361 at radially opposite positions on both sides of the center of the base part 361. The orifice groove 363 extends straight radially through the center of the base part 361. The base part 361 of this piston restricting member 360 also doubles as the spring receiving part of the piston biasing means, and the piston restricting member 360 is biased forward and pressed against the cap member by the piston biasing means. Thus, an orifice is formed in the oil discharge path by the orifice groove 363 and the flat inner face of the cap member.

What is claimed is:

1. A tensioner comprising: a plunger having a plunger hole that is open on a rear side; a housing having a plunger bore that is open on a front side and accommodates the plunger slidably; a main biasing means accommodated in an oil pressure chamber formed between the plunger and the plunger bore such as to freely extend and contract and urging the plunger to the front side; and a relief mechanism that relieves oil inside the oil pressure chamber out of the plunger when the oil pressure in the oil pressure chamber rises, the relief mechanism including a partition part that partitions inside of the plunger hole into the oil pressure chamber and an adjustment space and includes an internal relief hole that allows the oil pressure chamber to communicate with the adjustment space, an external relief hole formed to the plunger and allowing the adjustment space to communicate with an outer space, a piston set such as to be slidable back and forth with at least part thereof being positioned inside the internal relief hole, a piston biasing means that biases the piston toward the oil pressure chamber, and a piston restricting member set such as to be biased toward the front side by the piston biasing means and restricting movement of the piston toward the adjustment space, the piston restricting member having an orifice function that allows for control of an amount of oil discharged from the adjustment space via the external relief hole, wherein the piston biasing means comprises a coil spring, the piston restricting member having a shaft part extending continuously from a surface facing the adjustment space rearward, the shaft part being positioned radially inside the coil spring.

2. The tensioner according to claim 1, wherein the external relief hole is formed to open in a top face on a front side of the plunger hole, the piston restricting member including a communication part that connects a surface in contact with the top face on the front side of the plunger hole and a surface facing the adjustment space, and an orifice groove formed in the surface in contact with the top face, the orifice groove communicating with the communication part and the external relief hole, whereby an orifice is provided.

3. The tensioner according to claim 1, wherein the piston includes a main body set inside the internal relief hole and a flange part provided on a front end of the main body, the flange part being configured such as to change volume of the adjustment space as the piston moves.

4. The tensioner according to claim 1, wherein the plunger includes a cylindrical plunger body and a cap member attached to a front end of the cylindrical plunger body, the external relief hole being provided to the cap member.

5. The tensioner according to claim 1, wherein the piston restricting member is made of a resin material.

* * * * *